United States Patent [19]
Belcher

[11] Patent Number: 5,860,682
[45] Date of Patent: Jan. 19, 1999

[54] STRESS ISOLATED SEAL FOR FLEXIBLE FLOWLINE CONNECTOR

[75] Inventor: John R. Belcher, Panama City Beach, Fla.

[73] Assignee: Wellstream, Inc., Panama City, Fla.

[21] Appl. No.: 729,584

[22] Filed: Oct. 11, 1996

Related U.S. Application Data

[63] Continuation-in-part of Ser. No. 493,086, Jun. 21, 1995, Pat. No. 5,639,128.

[51] Int. Cl.$^6$ ...................................................... F16L 39/02
[52] U.S. Cl. .................................... 285/222.1; 285/222.4; 285/255
[58] Field of Search ............................. 285/222.1, 222.2, 285/222.3, 222.4, 222.5, 239, 238, 255, 259, 249, 245, 246, 247

[56] References Cited

U.S. PATENT DOCUMENTS

| | | | |
|---|---|---|---|
| 1,676,036 | 7/1928 | Levitt | 285/222.2 |
| 2,473,441 | 6/1949 | Muller | 285/222.2 |
| 2,809,056 | 10/1957 | Kaiser | 285/222.2 |
| 3,117,808 | 1/1964 | Swick, Jr. et al. | 285/222.1 |
| 3,306,637 | 2/1967 | Press et al. | 285/222.1 |
| 3,415,545 | 12/1968 | Frey et al. | 285/222.1 |
| 4,875,717 | 10/1989 | Policelli | 285/222.1 |
| 4,950,001 | 8/1990 | Briggs | 285/222.2 |

FOREIGN PATENT DOCUMENTS

| | | | |
|---|---|---|---|
| 734830 | 5/1966 | Canada | 285/131 |

*Primary Examiner*—Eric K. Nicholson
*Attorney, Agent, or Firm*—Browning Bushman

[57] ABSTRACT

The end fitting of a flexible flowline is provided with a mechanical clamp that secures the end fitting to the flowline while isolating the sealing area between the end fitting and the flowline from tension forces exerted on the flowline body. The pressure seal between the end fitting and the flowline is disposed behind the mechanical clamp so that the seal area of the flowline remains unaffected by flowline tension forces. The flowline is connected to the end fitting with a tubular assembly sleeve that is concentrically disposed between layers of the flow conduit adjacent the conduit end. During the initial assembly of the end fitting to the flowline, collet fingers in the assembly sleeve are snapped behind a receiving shoulder formed internally of the end fitting. The assembly sleeve may be welded to the flowline end before the sleeve is inserted into the end fitting. Snapn-in connection of the separable sleeve permits the flowline end to be welded and otherwise prepared for mating with the end connector before it is inserted into the end connector. In the assembled position, the sleeve is contained within the end fitting intermediate layers of the flowline end. The mechanical seal connecting the end fitting to the flowline body compresses the flowline radially toward the internal connector components to mechanically secure the end fitting and flowline body. The flowline end intermediate the clamp and the free end of the end fitting maintains a pressure seal with the surrounding end fitting and seal ring as the flowline is stressed in tension. Lateral and longitudinal adjustments in the fasteners of the clamp permit adjustment of the radial forces exerted by the sealing and clamping mechanism against the flowline.

20 Claims, 2 Drawing Sheets

STRESS ISOLATED SEAL FOR FLEXIBLE FLOWLINE CONNECTOR

CROSS-REFERENCE TO RELATED APPLICATIONS

This application is a continuation-in-part of U.S. patent application Ser. No. 08/493,086, filed Jun. 21, 1995, now U.S. Pat. No. 5,639,128 entitled "Method of and Apparatus for Securing a Multi-layered Flexible Flowline to an End Fitting."

BACKGROUND OF THE INVENTION

1. Field of the Invention

The present invention relates to the end attachment for a tubular flowline. More specifically, the present invention relates to an improved end connector for a flexible flowline in which the sealing mechanism between the connector and the flowline is isolated from tension forces existing in the flowline.

2. Brief Description of the Prior Art

The end connector described and claimed in the aforementioned parent of the present application is comprised of a tubular end fitting that receives the end of the flowline with a termination structure that both anchors and seals the flowline to the connector. As tension and pressure-induced forces are applied to the flowline, the material of the flowline forming the seal with the end fitting is distorted, which may damage and ultimately permit leakage failure of the seal.

The end connector described in U.S. Pat. No. 4,950,001 also employs a combined anchoring and sealing mechanism that exposes the sealing area of the flowline to the effects of tension and other induced forces acting in the flowline.

SUMMARY OF THE INVENTION

The apparatus and method of the present invention provide an end fitting for a flexible flowline that secures the flowline to the end fitting while isolating the seal area between the flowline and the fitting from the mechanical forces exerted on the flowline body. This result is obtained by securing the flowline to the end fitting with a mechanical clamp that engages the flowline and protects the portion of the flowline received within the end fitting from the effects of external forces on the flowline. The clamp is mechanically attached to the end fitting by an adjustable mechanism that can be manipulated axially and radially to control the gripping forces exerted by the clamp against the flowline body.

A gripping element disposed intermediate the clamp and an outer tubular layer of the flowline is provided with internal serrations that grip the flowline surface to enhance the interlocking engagement between the clamp and the flowline body. The internal clamping surface of the gripping element is tapered to provide an increasing radially directed gripping force as the clamp is adjusted axially relative to the flowline axis.

A seal ring encircling the end of the flowline that is received within the end fitting is employed to provide the main seal between the fitting and the flowline. The seal ring is provided with tapering surfaces that increase the pressure seal between the end fitting and the flow conduit as an end retaining ring at the base of the fitting is advanced axially toward the fitting to compress the seal ring between the fitting and the flowline end. The area of contact between the seal ring and flowline end is axially removed from the mechanical engagement provided by the clamp so that the seal area remains substantially protected from the distorting forces exerted by tension in the main flowline body externally of the fitting.

From the foregoing, it will be appreciated that an important object of the present invention is to provide a connector for the end of a flexible flowline in which the elements sealing the connector to the flowline are protected from the mechanical distortions that occur during the pressurizing and tensioning of the flowline itself.

Another object of the present invention is to provide a force-isolated sealing mechanism in the end connector of a flexible flowline that may be readily applied to the flowline and that produces increasing sealing capacity as the components of the connector are adjusted together.

It is yet another object of the present invention to provide, in a flowline connector of the type having assembly components that are mechanically interlocked rather than being cemented or otherwise permanently bonded together, a mechanism that increases the gripping and sealing forces of the connector against the flowline body as the components of the connector are mechanically tightened or adjusted into the final assembled form of the connector end fitting.

Another object of the present invention is to provide an end connector for use with a flexible flowline of the composite type having alternating layers of wound metal bands, elastomeric sealing layers, and tension strength layers, with a sealing mechanism that can be applied to the end of the flowline by a process wherein the gripping and sealing members of the connector components are mechanically secured to each other by adjustable fasteners.

It is an object of the present invention to provide a connector that can be applied, without the need for cementing, bonding, or other adhesive-type processes wherein the sealing portion of the end fitting is isolated from the mechanical forces tending to distort the main body of the flowline.

An important object of the present invention is to provide a connector assembly for use with a flexible flowline in which the sealing and anchoring portions of the assembly may be adjusted by lateral and axial adjustment of fasteners used to secure the assembly to the flowline and wherein the sealing portions of the assembly are protected from the forces existing in the flowline.

The foregoing features, objects, and advantages of the present invention will be more fully understood and appreciated by reference to the following drawings, specification, and claims.

DESCRIPTION OF THE PREFERRED EMBODIMENT

Figure 1:
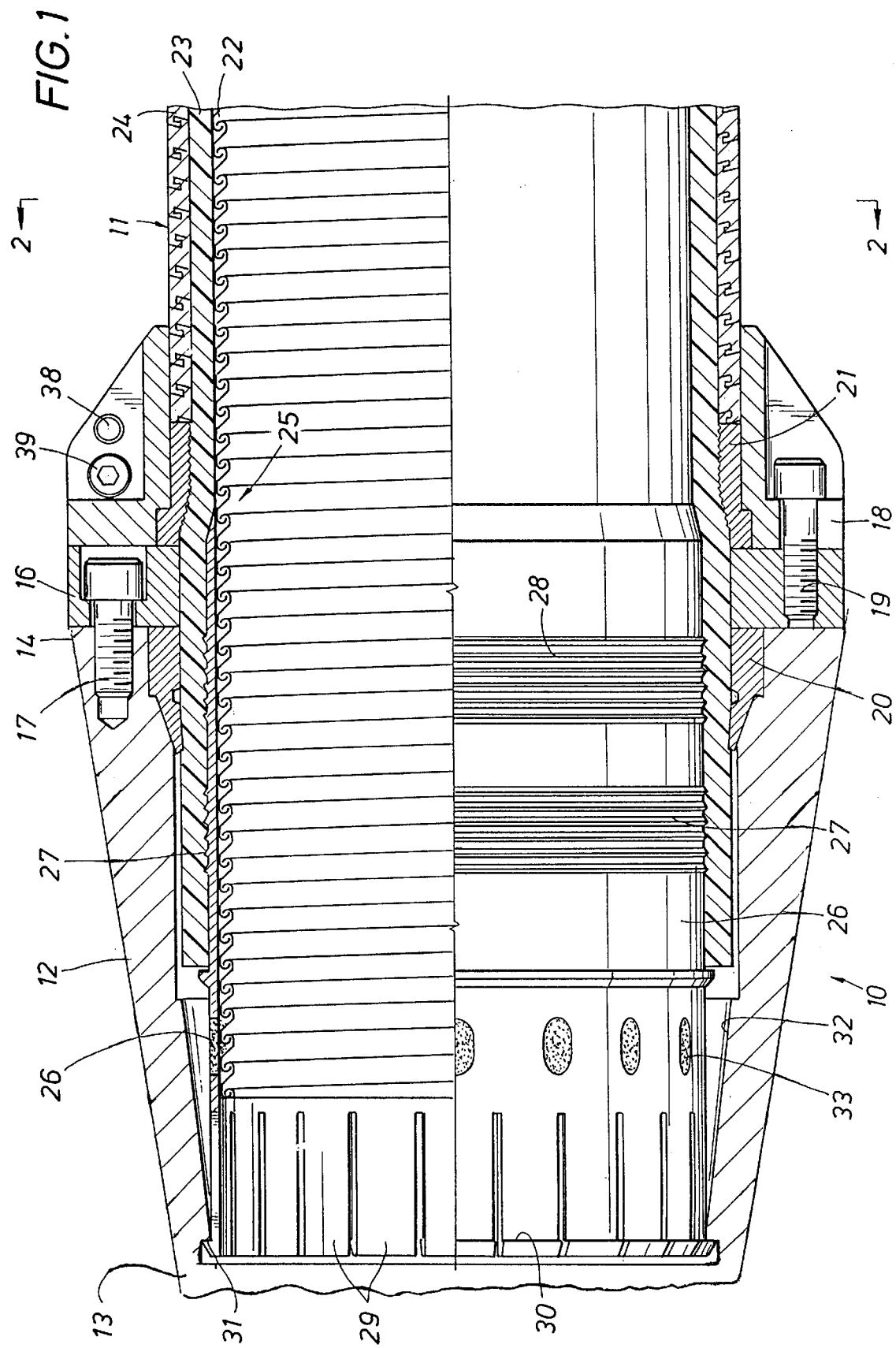
FIG. 1 is a partial vertical elevation, partially illustrated in vertical-section taken along the line 1—1 of FIG. 2, illustrating the flowline end connector of the present invention.

The flowline end fitting, indicated generally at 10 in FIG. 1, is illustrated connected to a tubular, flexible flowline 11. The fitting 10 includes a fitting body 12 having a connector end 13 and a flowline receiving end 14. The fitting body 12 is an integral part of the end fitting assembly 10 that includes a flange (not illustrated) adjoining the connector end 13 or another suitable connecting mechanism, which in turn is employed to secure the assembly 10 with attached flowline 11 to another flowline, riser pipe, pipeline, or other fluid conducting body (not illustrated).

The flowline receiving end 14 of the body 12 is connected to an annular seal retaining ring clamp 16 by threaded bolts 17 that extend from the ring clamp into the base of the tubular connector body 12. As will be described, the ring clamp 16 acts longitudinally to activate the seal of the fitting 10.

An annular radial clamp 18 is secured to the retaining ring clamp 16 by bolts 19 that extend from the radial clamp 18 into the retaining ring clamp 16. As will be described, the seal retaining ring clamp 16 secures and compresses an annular pressure seal ring 20 while the radial clamp 18 secures and compresses a segmented, annular lock ring 21 that is preferably comprised of plural, arcuate sections that cooperate to form an annular grip on the underlying flowline.

The flowline 11, which is of conventional construction, is formed of a central, helically wound, compression-resistant inner carcass 22. The tubular carcass body may be formed of one or more interlocking, helically wound metal bands. A layer of polymer material 23 is disposed about the carcass 22 to provide a pressure and leakage barrier. A helically wound metal burst-resistant layer 24 overlies the seal barrier layer 23. The various layers 22, 23, and 24 of the flowline 11 function in a conventional manner to provide the necessary structural strength and sealing characteristics of a flexible flowline. While the flowline 11 has been described with only three layers of material, it will be appreciated that the conduit may in fact include a number of additional layers for tension force capacity, sealing capacity, and other desired operational characteristics for the flowline.

The flowline 11 has a flowline end indicated generally at 25 that extends through the clamps 16 and 18 and into the tubular body 12 of the connector 10. The flowline end is partially secured to the connector body 12 by a metal, tubular assembly sleeve 26 that is concentrically disposed between the polymer layer 23 and the internal carcass 22 of the flowline end 25. The external surface of the assembly sleeve 26 is provided with serrations 27 and 28 that have opposing profiles to assist in anchoring with the internal surface of the polymer layer 23. The free end of the assembly sleeve 26 is provided with resilient collet fingers 29 that are equipped with radially outwardly directed lips 30 extending over an internal shoulder 31 formed on the inner surface of the tubular body 12. A conical surface 32 extending from the central opening of the body 12 toward the shoulder 31 is employed to compress and direct the collet fingers 29 into locking position within the tubular body 12, as will hereinafter be more fully described. Radial openings 33 formed in the wall of the assembly sleeve 26 are employed to weld the internal carcass 22 to the assembly sleeve.

Figure 2:
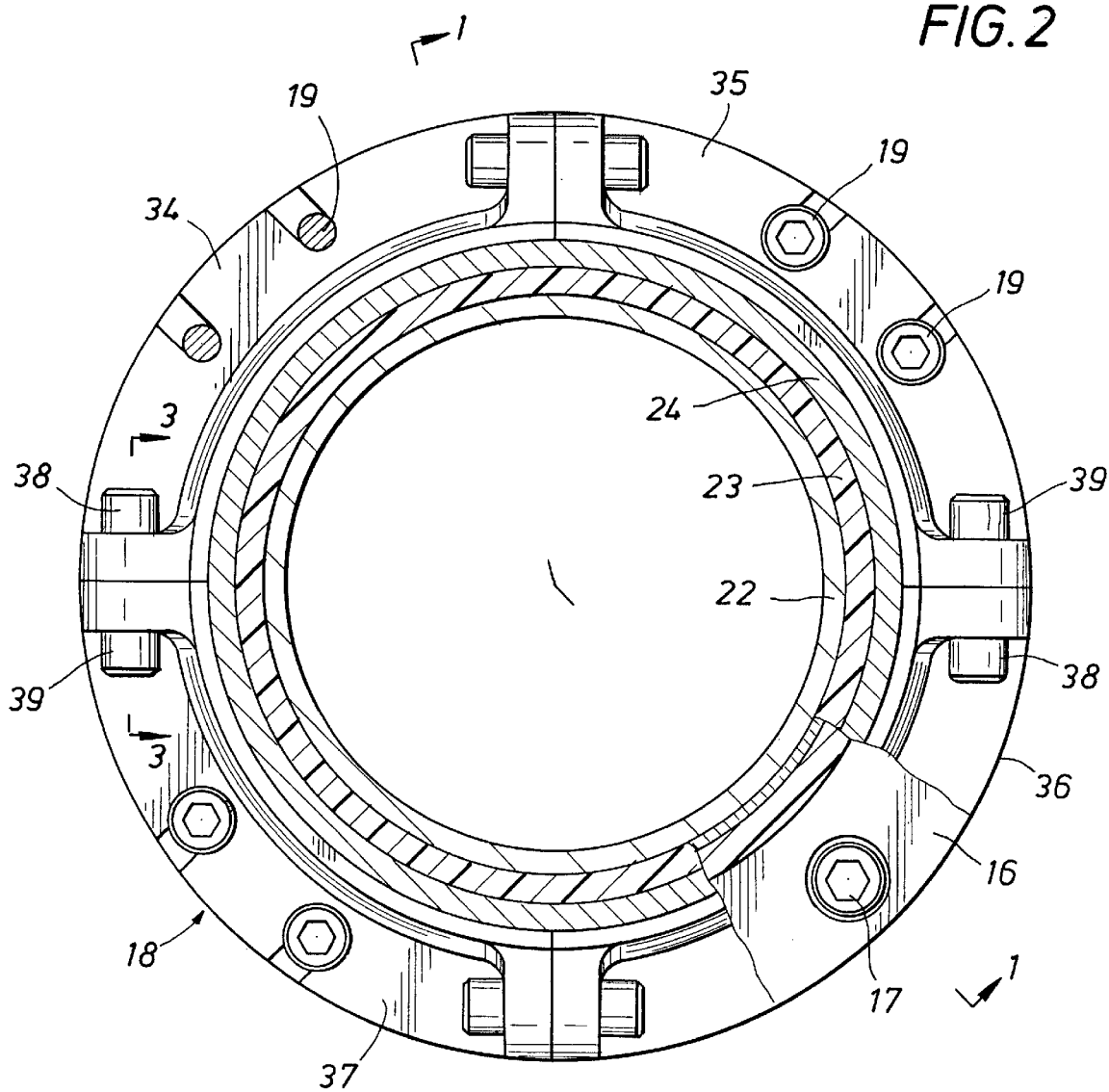
FIG. 2 is a vertical cross-sectional view, taken along the line 2—2 of FIG. 1, illuistating an end view of the flowline connector of the present invention.
Figure 3:
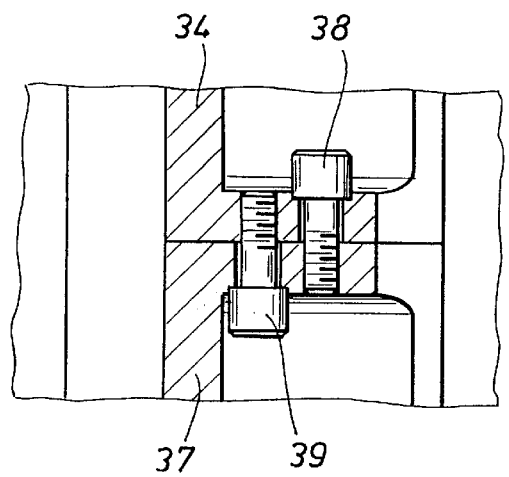
FIG. 3 is a partially cutaway detail, taken along the line 3—3 of FIG. 2, illustrating details in the connection of the clamp mechanism of the present invention.

With reference to FIG. 2, the clamp 18 is formed of four segments 34, 35, 36, and 37. The segments are held together by bolts 38 and 39, as may be best illustrated by joint reference to FIGS. 2 and 3. The bolts 19 secure the clamp 18 into the seal retaining ring clamp 16. As thus illustrated, it will be appreciated that the clamp 18 is secured to the retaining ring clamp 16, which in turn is secured to the tubular body 12 to form a connecting outer clamp assembly structure for the flowline end fitting 10.

The flowline end fitting assembly 10 of the present invention is initially assembled by inserting the assembly sleeve 26 between the polymer layer 23 and the carcass 22. The seal retaining ring clamp 16, annular seal 20, and lock ring 21 are then positioned over the flowline end 25. The free end of the assembly sleeve 26 is then inserted into the tubular body 12 and advanced toward the connector end 13. Advancing the flowline end into the connector body 12 causes the collet fingers 29 to engage the conical surface 32, compress radially inwardly, and snap outwardly once the collet lips 30 have cleared the shoulder 31. With the collet fingers snapped radially outwardly, as illustrated in FIG. 1, reverse movement of the flowline end 25 out of the connector body 12 is prevented by the engagement of the lips 30 and shoulder 31.

After the flowline end 25 is in place as illustrated in FIG. 1, the seal ring 20 is advanced into the position illustrated in FIG. 1, and the seal retaining ring clamp 16 is positioned behind the seal ring and bolted to the body 12 with the bolts 17. Tightening the bolts 17 draws the retaining ring 16 longitudinally toward the connector end 13 of the tubular body 12, which compresses the seal ring 20 against the inwardly tapered surfaces within the body 12 surrounding the seal ring. This longitudinal adjustment forces the seal ring down into firm sealing engagement with the polymer layer 23. The four segments of the clamp 18 assembly are secured together to form an annular, radial clamp mechanism around the flowline 11 that is tightened radially by lateral adjustment of the bolts 38 and 39. The clamp mechanism 18 is connected to the retaining ring by the bolts 19, which are tightened to advance the clamp longitudinally toward the connector end 13 of the body 12. The force exerted by the lock ring 21 is thus adjusted by the tightening of the longitudinally adjustable fasteners 17 and 19 and the laterally adjustable fasteners 38 and 39, causing the lock ring 21 to compress the underlying polymer layer 23 against the assembly sleeve 26 and the outer surface of the carcass 25. It will be appreciated that the tapering contour of the lock ring 21 cooperates with the oppositely tapered end area of the assembly sleeve 26 to increase the radially directed locking forces exerted by the ring 21 against the flowline 11 as the clamp is advanced toward the retaining ring 16. Tightening of the bolts 38 and 39 is coordinated with the advancement of the bolts 19 to provide a compressive, as well as axially directed, constricting force on the clamp 21.

As illustrated in its assembled configuration in FIG. 1, it will be appreciated that the clamps 16 and 18 and lock ring 21 cooperate to mechanically secure the flowline end 25 within the tubular body 12 to prevent separation of the two components. The seal ring 20, which is disposed between the clamp 18 and the connector end 13, cooperates with the flowline end 25 to form a pressure seal that is isolated from the effects of tension and other forces acting in the flowline 11 beyond the clamp 18.

The foregoing disclosure and description of the invention is illustrative and explanatory thereof, and it will be appreciated by those skilled in the art that various changes in the size, shape, and materials, as well as in the details of the illustrated construction or combinations of features of the various system elements and the method discussed herein, may be made without departing from the spirit of the invention.

What is claimed is:

1. An end fitting connector for securing one end of a multilayer flexible flowline to an adjacent flowline or the like, comprising:

an axially extending tubular end fitting having a connected end and a flowline receiving end;

a tubular sleeve member separable from said end fitting and having a first end positioned between layers of said flowline end;

a clamp securing said flowline to said flowline receiving end of said fitting; and a compression seal disposed radially between said flowline and said fitting intermediate said clamp and said connector end for forming a pressure seal between said flowline and said fitting whereby said compression seal is isolated from mechanical forces exerted on said flowline beyond said clamp.

2. The connector as defined in claim 1, wherein said seal comprises an annular seal ring disposed between said end fitting and said flowline for pressing a layer of said flowline toward said sleeve member.

3. The connector as defined in claim 1, further including a securing connection at a second end of said sleeve member adapted to be secured internally of said tubular end fitting at an axial position wherein said flowline end is contained within said tubular end fitting between said connector end and said flowline receiving end of said end fitting, and wherein said tubular end fitting includes an internal fitting surface adapted to engage and secure said securing connection as said sleeve is moved axially into said tubular end fitting.

4. An end fitting connector for securing one end of a multila er flexible flowline to an adjacent flowline or the like, comprising:

an axially extending tubular end fitting having a connector end and a flowline receiving end;

a tubular sleeve member separable from said end fitting and having a first end positioned between layers of said flowline at said flowline end;

a clamp securing said flowline to said flowline receiving end of said fitting;

a seal disposed between said flowline and said fitting intermediate said clamp and said connector end for forming a pressure seal between said flowline and said fitting;

a securing connection at a second end of said sleeve member adapted to be secured internally of said tubular end fitting at an axial position wherein said flowline end is contained within said tubular end fitting between said connector end and said flowline receiving end of said end fitting, and wherein said tubular end fitting includes an internal fitting surface adapted to engage and secure said securing connection as said sleeve is moved axially into said tubular end fitting; and wherein said internal fitting surface includes a conical surface area with a smaller diameter adjacent an annular groove and said securing connection comprises a snap connector having resilient lipped prongs whereby said axial movement of said sleeve into said end fitting initially moves said prongs against said conical surface area and toward said groove to compress said prongs radially inwardly for subsequent movement radially outwardly to secure to said end fitting when the lips on said prongs register with said groove whereby said sleeve is fixed axially relative to said end fitting.

5. The connector as defined in claim 3, wherein said seal comprises a seal ring disposed between said end fitting and said flowline for pressing a layer of said flowline toward said sleeve member.

6. The connector as defined in claim 4, wherein said seal comprises a seal ring disposed between said end fitting and said flowline for pressing a layer of said flowline toward said sleeve member.

7. The connector as defined in claim 1, further including welding access openings for welding said sleeve member to one of said flowline layers.

8. The connector as defined in claim 7, wherein said sleeve member is welded to one of said flowline layers.

9. The connector as defined in claim 1, wherein said sleeve includes serrations on its surface to form holding engagement with a flowline layer in contact with said sleeve.

10. The connector as defined in claim 5, wherein said sleeve includes serrations on its surface to form holding engagement with a flowline layer in contact with said sleeve.

11. The end fitting as defined in claim 1, wherein said clamp transfers tension forces in said flowline to said end fitting for reducing tension forces in said flowline end whereby said seal maintains said pressure seal between said flowline end and said fitting when said flowline is in tension.

12. The end fitting as defined in claim 11, wherein said clamp comprises an annular body having adjustable clamping structure for increasing the radially directed forces exerted by said clamp against said flowline.

13. The end fitting as defined in claim 12, wherein said clamp comprises an annular body having longitudinally and laterally adjustable clamping structure for increasing the radially directed forces exerted by said clamp against said flowline.

14. A method of attaching an end fitting to one end of a flexible flowline for coupling said flowline to an adjacent flowline or the like, said flowline having an elongate tubular body with inner and outer layers and a flowline end, comprising the steps of:

inserting a first end of a tubular sleeve between said inner and outer layers of said flexible flowline at said flowline end;

inserting a second end of said sleeve and said flowline end into said end fitting;

clamping said flowline to said end fitting with a clamp mechanism to protect said flowline end from tension forces in said elongate tubular body; and forming a compression seal between said clamp mechanism and said flowline to seal said end fitting to said flowline in an area of said flowline that is isolated from forces acting on said flowline.

15. The method as defined in claim 14, further comprising the step of applying a seal ring between said end fitting and said sleeve for pressing a layer of said flowline end toward said sleeve.

16. The method as defined in claim 15, further comprising the step of welding said sleeve to a layer of said flowline.

17. The method as defined in claim 15, further comprising the step of serrating a surface of said sleeve for holding a layer of said flowline.

18. The method as defined in claim 14, further including the steps of longitudinally and laterally adjusting fasteners in said clamp mechanism for changing the clamping force exerted by said clamp mechanism against said flowline.

19. A flexible flowline end connector, comprising:

a tubular end piece having first and second axial ends;

a collapse-resistant flexible tubular conduit having a conduit end extending into and beyond said first axial end of said end piece;

a pressure sealing flexible barrier layer overlying said conduit end of said collapse-resistant conduit;

a mechanical clamp extending from said first axial end of said end piece and compressing said barrier layer into said collapse-resistant conductor for holding said flowline and for reducing the tension exerted on said conduit end extending into said end piece; and an annular compression seal disposed radially about said conduit intermediate said clamp and said second axial end of said end piece for sealing said end piece to said barrier layer.

20. A connector for securing the end of a flexible flowline to a separate flow conduit, comprising:

a multilayer, axially extending flexible flowline;

an axially extending tubular connection end piece having a flow conduit connecting end and a flowline connecting end;

an axially extending intermost central tubular collapse-resistant layer included in said flexible flowline and received within the flowline connecting end of said connection end piece;

an annular clamping mechanism encircling said flexible flowline and securing said flowline to said end piece; and an annular sealing member encircling said flowline between said end piece and said flexible flowline for forming an annular seal between said flowline and said end piece, said seal being disposed intermediate said clamping mechanism and said flow conduit connection end.

* * * * *

UNITED STATES PATENT AND TRADEMARK OFFICE
CERTIFICATE OF CORRECTION

PATENT NO. : 5,860,682
DATED : January 19, 1999
INVENTOR(S) : John R. Belcher

It is certified that error appears in the above-identified patent and that said Letters Patent is hereby corrected as shown below:

In column 5, line 27, delete "multila er" and insert therefor --multilayer--.

In column 6, line 65, delete "conductor" and insert therefor --conduit--.

Signed and Sealed this

Eighth Day of June, 1999

Attest:

Q. TODD DICKINSON

*Attesting Officer*   Acting Commissioner of Patents and Trademarks